(12) United States Patent
Imayou et al.

(10) Patent No.: US 9,725,017 B2
(45) Date of Patent: Aug. 8, 2017

(54) VEHICLE SEAT

(71) Applicant: TACHI-S CO., LTD., Akishima-shi, Tokyo (JP)

(72) Inventors: Kazuya Imayou, Ome (JP); Toshiki Igarashi, Ome (JP); Masaaki Honda, Ome (JP); Yayoi Hirano, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 53 days.

(21) Appl. No.: 14/770,591

(22) PCT Filed: Dec. 4, 2013

(86) PCT No.: PCT/JP2013/082520
§ 371 (c)(1),
(2) Date: Aug. 26, 2015

(87) PCT Pub. No.: WO2014/132517
PCT Pub. Date: Sep. 4, 2014

(65) Prior Publication Data
US 2016/0001682 A1    Jan. 7, 2016

(30) Foreign Application Priority Data

Feb. 27, 2013  (JP) .................................. 2013-036831

(51) Int. Cl.
*A47C 1/08* (2006.01)
*A47C 1/10* (2006.01)
(Continued)

(52) U.S. Cl.
CPC ......... *B60N 2/2887* (2013.01); *B60N 2/2881* (2013.01); *B60N 2/2893* (2013.01);
(Continued)

(58) Field of Classification Search
CPC .. B60N 2/2893; B60N 2/4221; B60N 2/4228; B60N 2/42709; B60N 2/289;
(Continued)

(56) References Cited

U.S. PATENT DOCUMENTS 5,941,601 A * 8/1999 Scott .................... B60N 2/2821
297/250.1
6,276,754 B1 * 8/2001 Youssef-Agha ......... B60N 2/28
24/682.1
(Continued)

FOREIGN PATENT DOCUMENTS

JP     2001063429 A    3/2001
JP     2002211287 A    7/2002
(Continued)

OTHER PUBLICATIONS

Extended European Search Report corresponding to Application No. 13876630.8-1754/2952382 PCT/JP2013/082520; Date of Mailing: May 9, 2016.
(Continued)

*Primary Examiner* — Chi Q Nguyen
(74) *Attorney, Agent, or Firm* — Cantor Colburn LLP (57)    ABSTRACT

A vehicle seat with a child seat may have an engagement member, comprising anchors to hold the child seat. Each anchor may have a pair of left and right side bars and a front bar coupled to the side bars. The front bars are engaged with the engagement member. The side bars are secured by brackets to a connecting pipe of the seat cushion or the seatback. Each recess may be made in a pad. A trim cover may have openings each above the recess. The engagement member may have a bifurcated shape and has a groove engaged with the front bar. The connecting members, having one end connected to a trim cover terminal behind the opening and the other end engaged with the bracket, may be wound around the connecting pipe and stretched between the bracket and the trim cover terminal, each drawing the terminal into the recess.

10 Claims, 9 Drawing Sheets

(51) Int. Cl.
  *B60N 2/28* (2006.01)
  *B60N 2/58* (2006.01)
  *B60N 2/60* (2006.01)
  B60N 2/42 (2006.01)
  B60N 2/427 (2006.01)

(52) U.S. Cl.
  CPC ......... *B60N 2/5816* (2013.01); *B60N 2/5825* (2013.01); *B60N 2/6009* (2013.01); *B60N 2/2806* (2013.01); *B60N 2/286* (2013.01); *B60N 2/2809* (2013.01); *B60N 2/289* (2013.01); *B60N 2/2854* (2013.01); *B60N 2/2863* (2013.01); *B60N 2/427* (2013.01); *B60N 2/4221* (2013.01); *B60N 2/4228* (2013.01); *B60N 2/42709* (2013.01)

(58) Field of Classification Search
  CPC .... B60N 2/286; B60N 2/2806; B60N 2/2809; B60N 2/2863; B60N 2/427; B60N 2/2854; B60N 2/2887
  USPC ...................................... 297/250.1, 253, 254
  See application file for complete search history.

(56) References Cited

U.S. PATENT DOCUMENTS

| | | | | |
|---|---|---|---|---|
| 6,375,260 | B1* | 4/2002 | Hiramatsu | B60N 2/2821 297/250.1 |
| 6,499,786 | B2* | 12/2002 | Takahashi | B60N 2/28 280/801.1 |
| 7,721,406 | B2* | 5/2010 | McCay | B21F 5/00 29/509 |
| 9,022,340 | B2* | 5/2015 | McLeod | B60N 2/2887 248/500 |
| 2002/0011505 | A1* | 1/2002 | Cole | B60R 5/00 224/275 |
| 2004/0051356 | A1* | 3/2004 | Neelis | B60N 2/289 297/253 |
| 2004/0080194 | A1* | 4/2004 | Medvecky | B60N 2/2887 297/253 |
| 2004/0080195 | A1* | 4/2004 | Adams | B60N 2/2887 297/253 |
| 2004/0227384 | A1* | 11/2004 | Smallwood | B60N 2/289 297/253 |
| 2004/0261246 | A1* | 12/2004 | Duffy | B60N 2/286 29/509 |
| 2005/0082103 | A1* | 4/2005 | Garcia, Jr. | B60N 2/002 180/272 |
| 2013/0147246 | A1 | 6/2013 | Nakakita et al. | |

FOREIGN PATENT DOCUMENTS

| | | |
|---|---|---|
| JP | 2004058764 A | 2/2004 |
| JP | 2009274467 A | 11/2009 |
| JP | 5112567 B1 | 1/2013 |

OTHER PUBLICATIONS

International Search Report corresponding to Application No. PCT/JP2013/082520; Date of Mailing: Mar. 11, 2014, with English translation.

* cited by examiner

VEHICLE SEAT

CROSS-REFERENCE TO RELATED APPLICATIONS

This is the U.S. national stage of application No.: PCT/JP2013/082520, filed on Dec. 4, 2013. Priority under 35 U.S.C. §119(a) and 35 U.S.C. §365(b) is claimed from Japanese Application No. 2013-036831, filed Feb. 27, 2013, the disclosure of which is also incorporated herein by reference.

BACKGROUND OF THE INVENTION

Field of the Invention

This invention relates to a vehicle seat having anchors that can hold a child seat.

Description of the Related Art

The ISO-FIX standard is known as international standard of systems for holding child seats to vehicle seats. A vehicle seat is disclosed in, for example, JP 2002-211287A. The vehicle seat has anchors that accord with the ISO-FIX standard and can hold an ISO-FIX type child seat.

The child seat of ISO-FIX type has a pair of engagement members, i.e., left and right members, at the rear part. The engagement members are fastened to anchors. The anchors may be arranged at, for example, the rear edge of the seat cushion of a vehicle seat.

An anchor is known, which has been formed by bending a wire member (or solid rod member). The anchor has a pair of side bars (i.e., left and right side bars) and a front bar. The left and right side bars extend forwards and parallel to each other. The front bar couples the upper end of the left and right side bars, and the anchor is substantially U-shaped as seen in the plan view.

The child seat has, at the lower part of its back, a pair of engagement members, i.e., left and right engagement members that extending rearward. Each engagement member has a bifurcated shape in side view and has, at the rear end, a groove. The front bar of each anchor may be engaged in the groove made in the rear end of the engagement member, to hold the child seat to the vehicle seat.

In most cases, the lower arm of each engagement member is shorter than the upper arm, and may smoothly come into engagement with the front bar of the associated anchor.

The anchors are provided at the rear edge of the seat cushion or the lower edge of the seatback. The seat cushion and the seatback are each composed of a frame (i.e., skeleton member, namely seat cushion frame or seatback frame), a pad made of foamed material such as urethane foam and covering the frame, and a trim cover covering the pad. To provide the anchors at the rear edge of, for example, the seat cushion, the seat cushion frame is composed of left and right side frames and two connecting pipes, one connecting the front ends of the side frames and the other connecting the rear ends of the side frames. Therefore, the seat cushion frame is a substantially rectangular frame as seen in plan view. The anchors are secured to the rear connecting pipe and arranged at the rear edge of the seat cushion.

To arrange the anchors at the rear edge of the seat cushion, the pad of the seat cushion has recesses each for receiving the associated anchor. The trim cover has openings each above the associated recess. That part of the trim cover, which surrounds the openings, is processed (i.e., terminal-processed).

JP 2002-211287A describes that the rear ends of the side bars of each anchor are wound around the connecting pipe, from the upper part to the rear part of the circumferential surface of the connecting pipe. The rear ends of the side bars, so wound, are covered with the brackets from back to front. The rear ends of the side bars and the bracket are secured to the connecting pipe by means of welding.

Patent Literature: Japanese Patent unexamined Publication JP 2002-211287A

When the child seat is inclined, with its back lowered, the engagement members provided at the back is engaged with the front bars of each anchor provided at the rear edge of the seat cushion. Since the child seat is inclined, however, each engagement member having a substantially bifurcated shape may bite the trim cover terminal behind the opening. Particularly, the lower arm of the engagement member may bite the trim cover terminal if it is shorter than the upper arm.

If the lower arm of each engagement member enters the opening of the trim cover and bites the trim cover terminal behind the opening, the trim cover terminal is drawn into the groove made in the rear end of the engagement member. Then, the front bar of the associated anchor cannot go to the rear end of groove, resulting in poor engagement. Each anchor may fail to completely hold the child seat to the vehicle seat.

If each engagement member bites the trim cover terminal behind the opening, the trim cover terminal is drawn into the groove, inevitably damaging the trim cover terminal, ultimately impairing the outer appearance of the trim cover.

The brackets is used to secure the anchors is disclosed in JP 2002-211287A. In this case, the recesses made in the pad, in which the anchors are provided, is longer in the front-rear direction. Consequently, the trim cover terminal will likely be drawn into the groove.

An object of one aspect of this invention is to provide a vehicle seat, in which even if brackets are used, the trim cover terminal can be prevented from being drawn into the groove made in the rear end of the engagement member.

SUMMARY OF THE INVENTION

In one aspect of this invention, each connecting member extends between one bracket and a trim cover terminal provided behind the opening of the trim cover, and the trim cover terminal is drawn into the recess made in the pad.

In this invention according to one aspect of the embodiment of claim 1, a vehicle seat in combination with a child seat, said child seat having an engagement member provided on a back comprises a seatback, a seat cushion, and a pair of anchors structured to hold the child seat of an ISO-FIX type, wherein each anchor has a pair of left and right side bars and a front bar coupled to upper ends of the left and right side bars, and is a U-shaped form as seen in a plan view, the front bars of the anchors are structured to engage with the engagement member provided on the back of the child seat, the left and right side bars of said each anchor are secured by brackets to a connecting pipe provided in the seat cushion or the seatback and extending in a direction parallel to the front bars of the anchors, a pair of recesses each for holding an anchor is made in a pad, a trim cover for covering the pad has openings each above a recess of the pad, the engagement member has a bifurcated shape as seen in a side view and has at a distal end a groove for engaging with the front bar of the anchor, and a pair of connecting members, which have one end connected to a terminal of the trim cover behind the openings of the trim cover and the other end engaged with the bracket, are wound around the connecting pipe and are stretched each between the bracket and the trim cover terminal behind the openings, each drawing the trim cover terminal behind the openings into the recess of the pad.

In one aspect of the embodiment of this invention, the connecting members are wound around one connecting pipe, extend between one bracket and the trim cover terminal behind the opening of the trim cover. Each connecting member draws the trim cover terminal behind the opening into the recess of the pad. The trim cover terminal behind the opening therefore escapes downwards. Therefore, the engagement members do not bite the trim cover terminal behind the opening even if they engage with the front bars of the associated anchors, respectively, while the child seat remains inclined with its back lowered. Thus, the trim cover terminal behind the opening is prevented from being drawn into the groove of the engagement member.

A vehicle seat in combination with a child seat, said child seat having an engagement member provided on a back; the vehicle seat comprises a seatback, a seat cushion, and a pair of anchors structured to hold the child seat of an ISO-FIX type, wherein each anchor has a pair of left and right side bars and a front bar coupled to upper ends of the left and right side bars, and is a U-shaped form as seen in a plan view, the front bars of the anchors are structured to engage with the engagement member provided on the back of the child seat, the left and right side bars of said each anchor are secured by brackets to a connecting pipe provided in the seat cushion or the seatback and extending in a direction parallel to the front bars of the anchors, a pair of recesses each for holding an anchor is made in a pad, a trim cover for covering the pad has openings each above a recess of the pad, the engagement member has a bifurcated shape as seen in a side view and has at a distal end a groove for engaging with the front bar of the anchor, and a pair of connecting members, which have one end connected to a terminal of the trim cover behind the openings of the trim cover and the other end engaged with the bracket, are wound around the connecting pipe and are stretched each between the bracket and the trim cover terminal behind the openings, each drawing the trim cover terminal behind the openings into the recess of the pad.

DETAILED DESCRIPTION OF THE INVENTION

Embodiment 1

Figure 1:
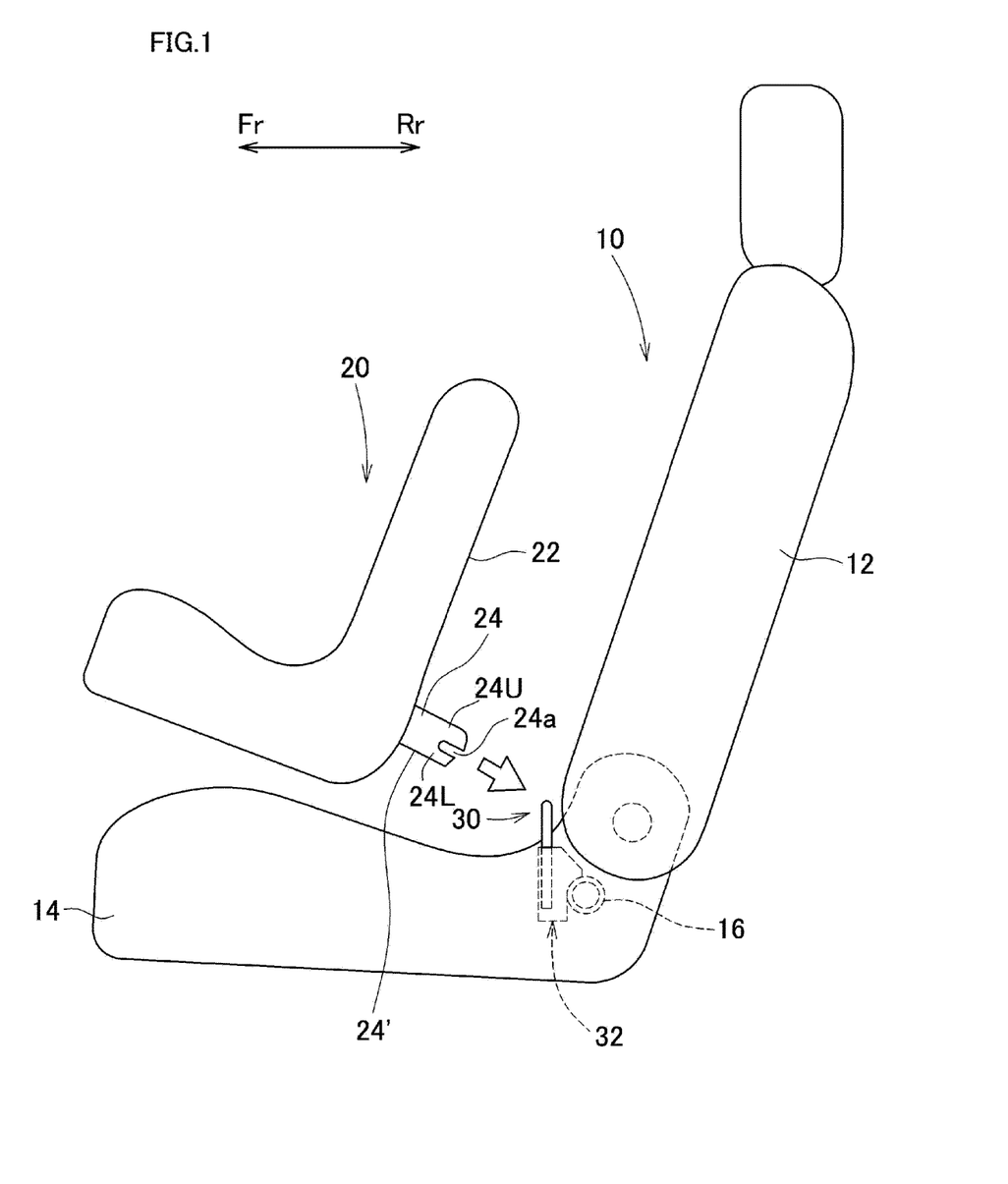
FIG. 1 is a schematic side view of a vehicle seat according to one embodiment (Embodiment 1) of this invention.
Figure 2:
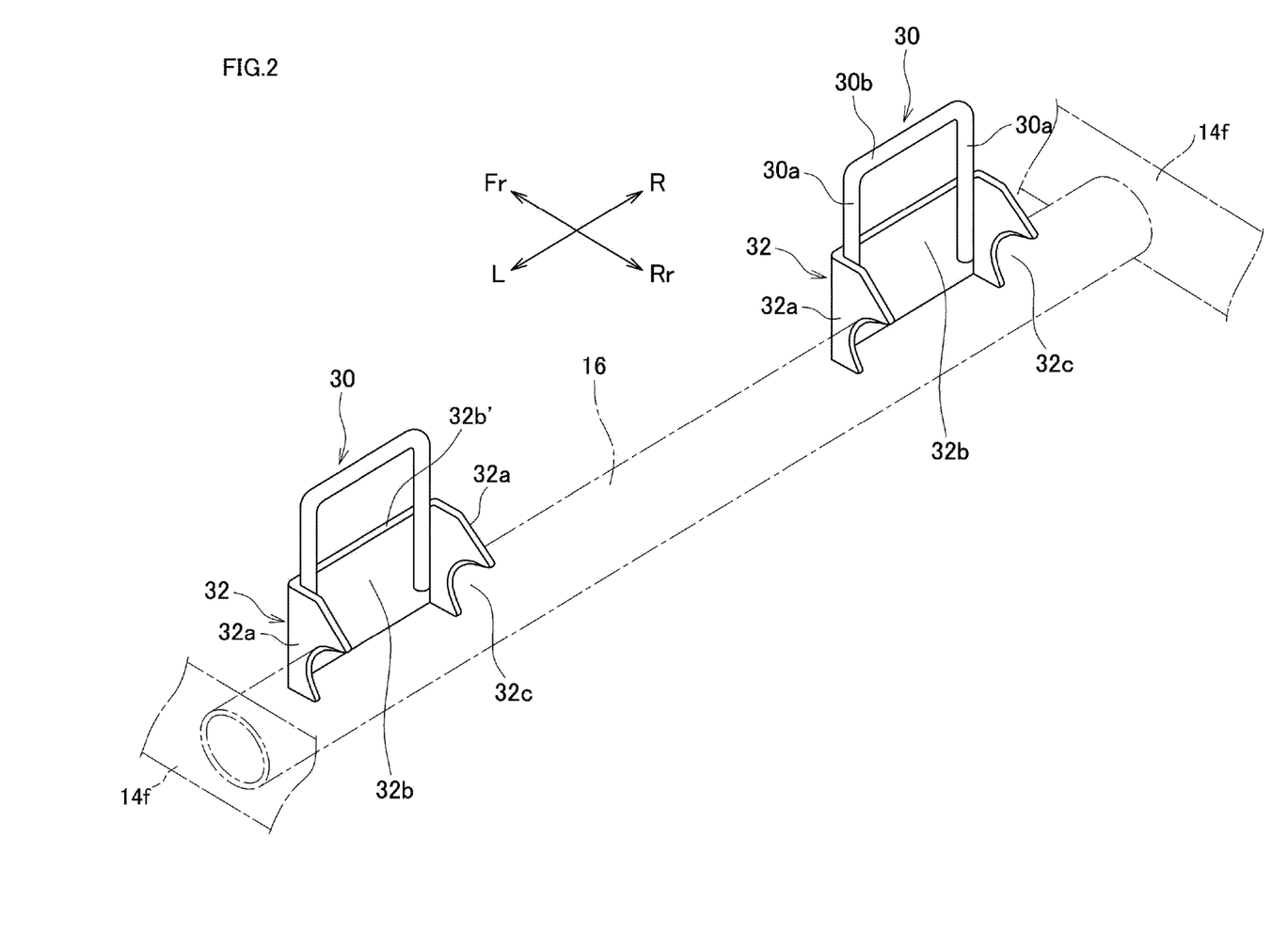
FIG. 2 is a perspective view of an embodiment of the anchors and brackets used in the vehicle seat.
Figure 2A:
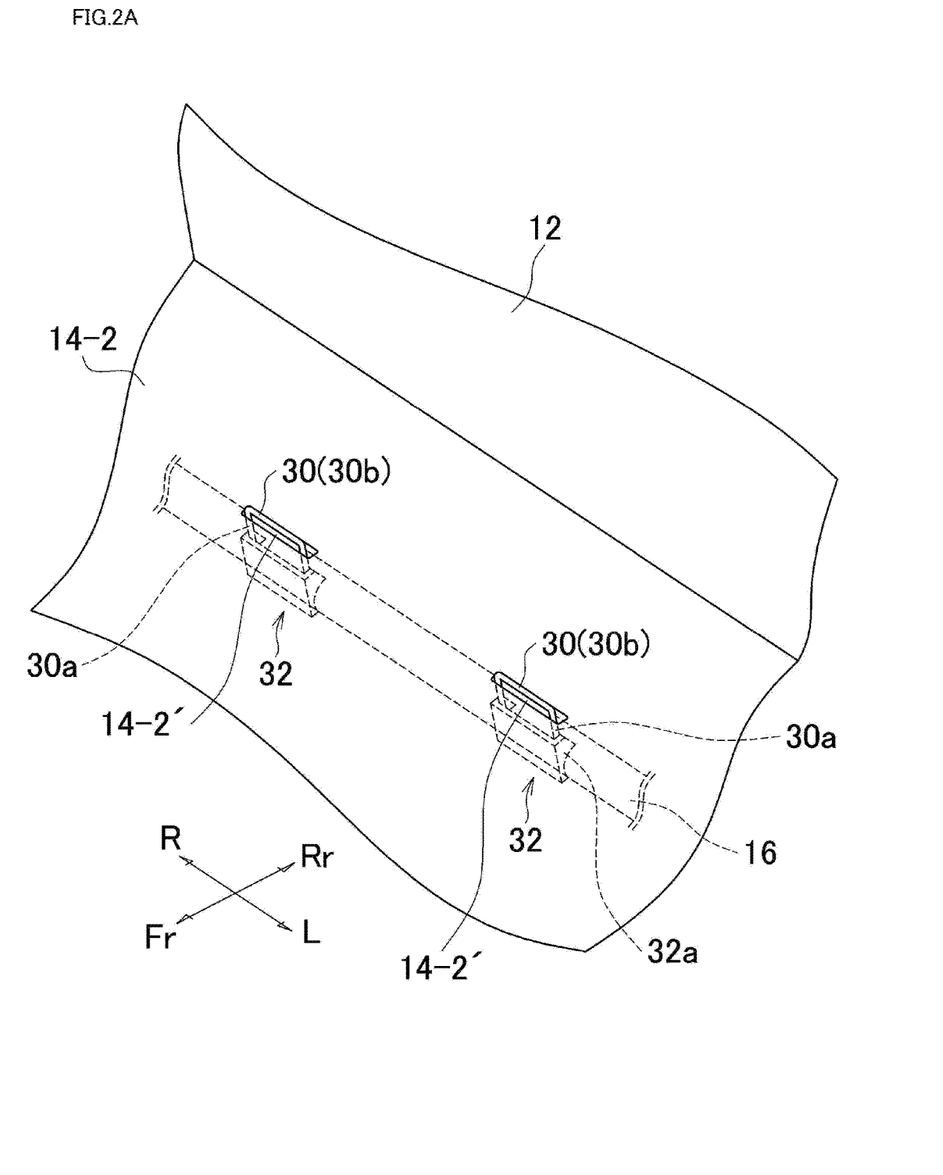
FIG. 2A is a perspective view of an embodiment of the anchors and brackets showing the openings in the trim cover.
Figure 3A:
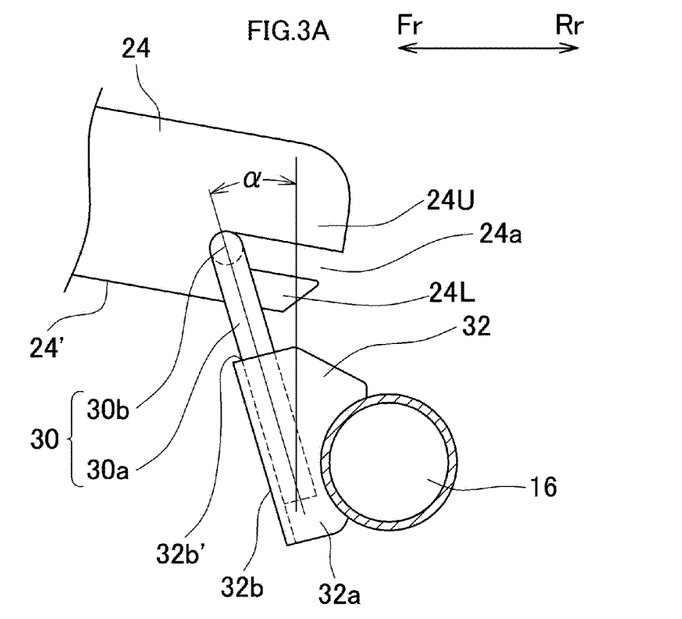
FIG. 3A is a partly sectional, side view of an embodiment of a child seat and one anchor having its side bars not deformed yet.
Figure 3B:
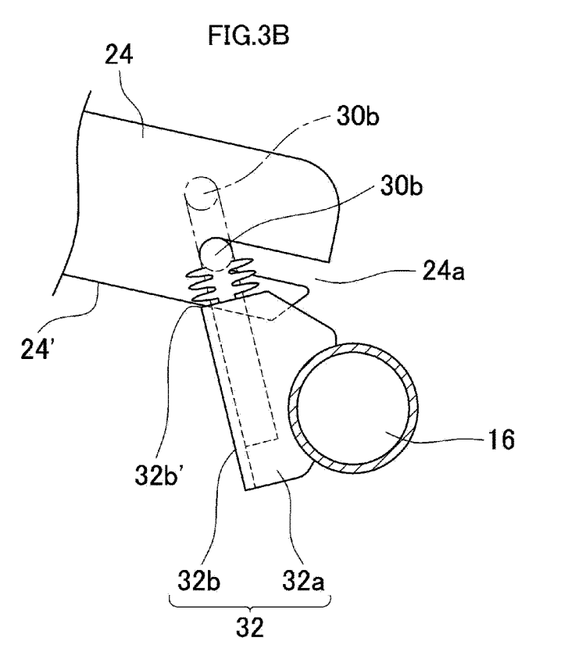
FIG. 3B is a partly sectional, side view of an embodiment of a child seat and one anchor having its side bars deformed.

Embodiments of this invention will be described in detail, with reference to the accompanying drawings. FIG. 1 is a schematic side view of a vehicle seat according to one embodiment (Embodiment 1) of this invention. FIG. 2 is a perspective view of an embodiment of the anchors and brackets used in the vehicle seat. FIG. 3A is a partly sectional, side view of an embodiment of a child seat and one anchor having its side bars not deformed yet. FIG. 3B is a partly sectional, side view of an embodiment of a child seat and one anchor having its side bars deformed. In the drawings, arrows Fr and Rr indicate the forward and rearward directions, and arrows L and R indicate the leftward and rightward directions, with respect to the driver seated in the driver seat.

As shown in FIG. 1, an embodiments of the vehicle seat 10 has a seatback 12 and a seat cushion 14. Between the lower edge of the seatback 12 and the rear edge of the seat cushion 14, a seat reclining device (not shown) is arranged to recline the seatback to the seat cushion.

The seat cushion 14 is composed of a seat cushion frame, a pad and a trim cover. The seat cushion frame is the skeleton covered with the pad made of foamed material such as urethane foam. The pad is covered with the trim cover. The seat cushion frame comprises a pair of side frames 14f (i.e., left and right side frames), and front and rear connecting pipes extending, respectively between the front ends of the left and right side frames 14f and between the rear ends thereof. Therefore, the side frames and the connecting pipes define a substantially rectangular frame as seen in the plan view.

In FIG. 1, only the rear connecting pipe 16 is shown, which extends between the rear ends of the side frames 14f of the seat cushion 14. The connecting pipe 16 is made of a pipe member having a circular cross section, as in most cases. Nonetheless, the pipe member may have non-circular cross section.

The pad has recesses for holding the anchors. The trim cover, which covers the pad, has an openings located above the recesses of the pad. The trim cover terminals are processed by means of, for example, sewing.

At the rear edge of the seat cushion 14, a pair of anchors, i.e., left and right anchors 30 that accord with the ISO-FIX standard, are arranged and spaced apart from each other by a preset distance in the left-right direction of the vehicle seat 10. The anchors 30 can hold an ISO-FIX type child seat 20.

As shown in FIG. 1, the child seat 20 has a pair of engagement members 24, i.e., left and right engagement members, extending rearwards from the lower part of the back 22. Each engagement member 24 has a groove 24a in the rear end. For example, the groove 24a may be an elongated groove. As shown in FIGS. 2 and 3A, the anchors 30 have been formed, each by bending a wire member. Each anchor 30 has left and right side bars 30a and a front bar 30b. The side bars 30a extend parallel to each other and forward obliquely from an upright position, and the front bar 30b couples the side bars 30a at the upper end. Hence, each anchor 30 is substantially U-shaped as seen in the plan view.

As the arrow shows in FIG. 1, the child seat 20 may be moved toward the front of the seatback 12 until the front bars 30b of the anchors 30 are engaged, respectively, in the grooves 24a of the left and right engagement members 24. The child seat 20 is thereby held by the anchors 30 and arranged on the seat cushion 14.

Since the front bar 30b of each anchor is engaged in the grooves 24a of the left and right engagement members 24, moving to the distal end of the groove 24a made in the engagement member, the anchors 30 completely hold the child seat 20 (see FIG. 3A).

Figure 4:
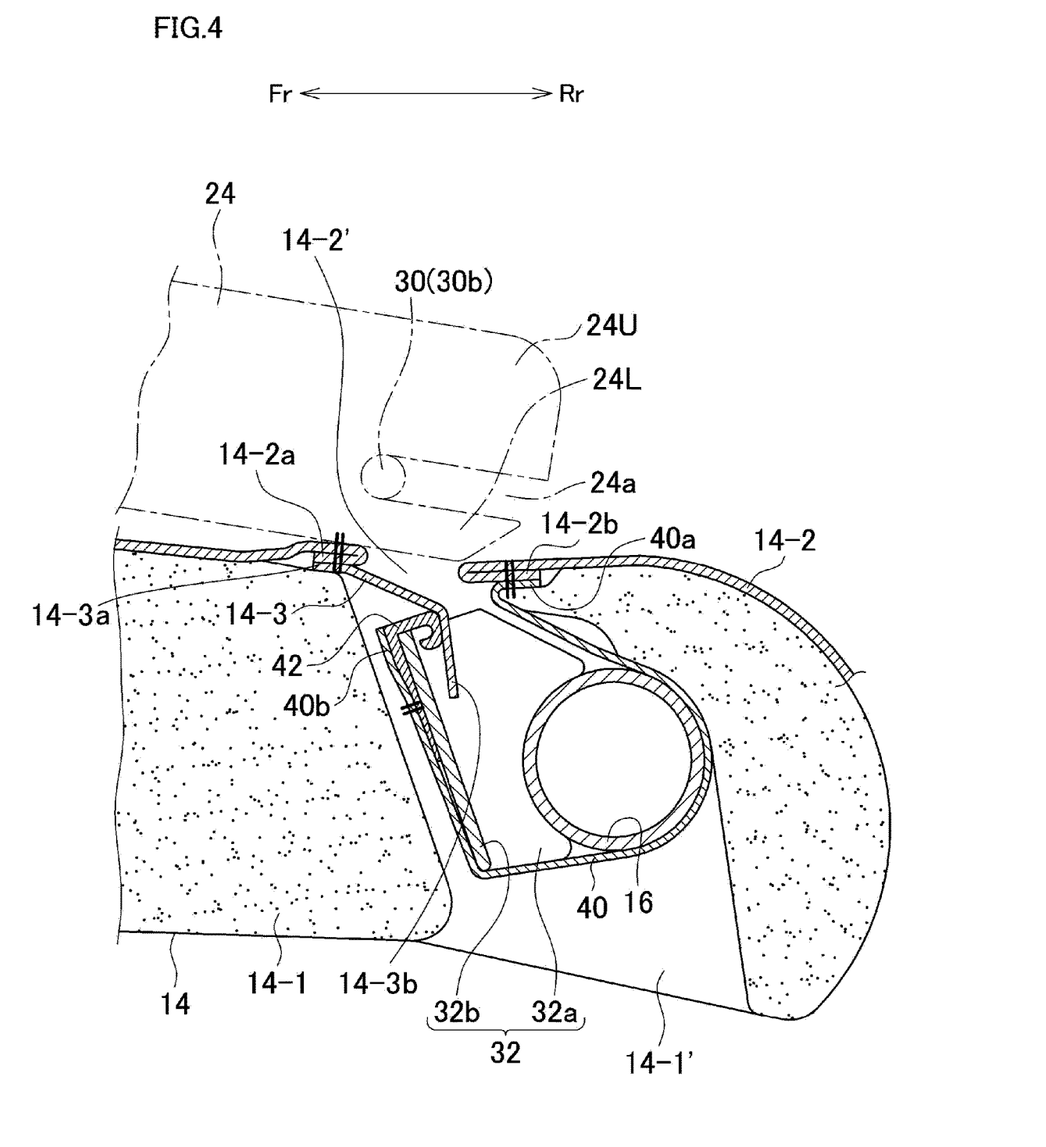
FIG. 4 is a schematic sectional view showing an embodiment of a seat cushion, taken along line orthogonal to the connecting pipe to which the anchors are secured by the brackets.

FIG. 4 is a schematic sectional view showing an embodiment of a seat cushion, taken along line orthogonal to the connecting pipe to which the anchors are secured by the brackets. As shown in FIG. 4, the pad 14-1 is cut at rear edge of the seat cushion, making a pair of recesses 14-1'. The trim cover 14-2 covering the pad has a pair of openings 14-2', each above one recess 14-1'. The trim cover terminals (i.e., front terminal 14-2a and rear terminal 14-2b), surrounding the opening 14-2' are processed (sewn, for example). In the embodiment, the recesses 14-1' penetrate the pad 14-1 in the vertical direction. Instead, the recesses may be bottomed.

As shown in FIGS. 2, 3A and 3B, the anchors 30 are secured by brackets 32 to the rear connecting pipe 16 extending in the left-right direction, namely extending in a direction parallel to the front bars of the anchors|[ . . . 1], between the rear ends of the left and right side frames 14F of the seat cushion frame, and extends forward obliquely from an upright position. The anchors 30 and the brackets 32 are arranged in the recesses 14-1' (see FIG. 4). Each bracket 32 has been formed by pressing, for example, a steel plate into a member substantially U-shaped as seen in the plan view and has left and right side walls 32a and a front wall 32b connecting the side walls. The left and right side bars 30a of each anchor 30 are secured, at a lower end of the left and right side bars, to the inner surface of the associated bracket 32, by means of welding. Nonetheless, the method of securing the side bars 30a to the bracket 32 is not limited to welding.

In the embodiment, the lower ends of the side bars 30a are secured, respectively to the inner surfaces of the side walls 32a and the front wall 32b, at the corner parts thereof, as shown in FIG. 2. Instead, the lower ends of the side bars 30a may be secured to the inner surface of the front wall 32b, and spaced apart from the side walls 32a. However, if the lower ends of the side bars 30a are secured to the inner surfaces of the side walls 32a and the front wall 32b at the corner parts thereof, they can be welded, each to both the side wall and the front wall, and hence can be more firmly secured to the bracket 32.

The side wall 32a of each bracket 32 has, in the rear edge, a notch 32c shaped complement to the front part of the circumferential surface of the connecting pipe 16. The bracket 32 to which each anchor 30 is secured is secured, from the front, to the connecting pipe 16 and opposes the engagement member 24, with the notches 32c holding the front circumferential surface of the connecting pipe. At this point, the side bars 30a extend forward obliquely from an upright position. The bracket 32 is secured to the connecting pipe 16 by means of, for example, welding, at the position where the side bars 30a are deformed, and the side bars and the engagement member 24 move down until the engaging member 24 abuts on the bracket 32.

As shown in FIG. 3A, the side bars 30a of either anchor extend forward from its upright position, inclining by an angle α of 15°. The inclination angle α is not limited to 15°, nevertheless. The inclination angle α preferably needs to have such a value as to cause the side bars 30a to undergo buckling deformation, not bending deformation. The inclination angle α is, for example, 10 to 25°.

The upper edge 32b' of the front wall 32b of the bracket is remoter from the connecting pipe 16 than any other parts of the bracket. This is why the bracket 32 is usually so positioned that the engagement member may abut, at lower surface 24' of the engaging member 24, on the upper edge of the front wall as it moves down. Nonetheless, the lower surface 24' of the engagement member does not need to abut on the upper edge 32b' of the front wall of the bracket. The bracket may lie at a position (i.e., below the engagement member 24) so that the engagement member 24 may abut on it, and may be prevented from moving down further.

In most cases, the child seat 20 is held to the seat 10 not only by engaging the engagement members 24 with the anchors 30, but also by using a tether belt. The tether belt is not directly related to this invention, and is not described herein.

The grooves 24a made in the left and right engagement members 24 are elongate ones in the embodiment. Nonetheless, the grooves 24a are not limited to elongate ones as far as they hold the anchors 30 (more precisely, front bars 30b), securing the child seat 20 to the seat cushion 14.

Having the groove 24a, the engagement member 24 has a bifurcated shape in side view, having an upper arm 24U and a lower arm 24L. The lower arm 24L is shorter than the upper arm 24U so that the front bar 30b of each anchor may be smoothly engaged in the groove 24a.

As shown in FIG. 4, a band-shaped connecting member 40 is stretched between each bracket 32 and the trim cover terminal 14-2b behind the opening 14-2'. The trim cover terminal 14-2b behind the opening 14-2' is drawn into the opening of the trim cover and ultimately into the recess 14-1' made in the pad.

Figure 5:
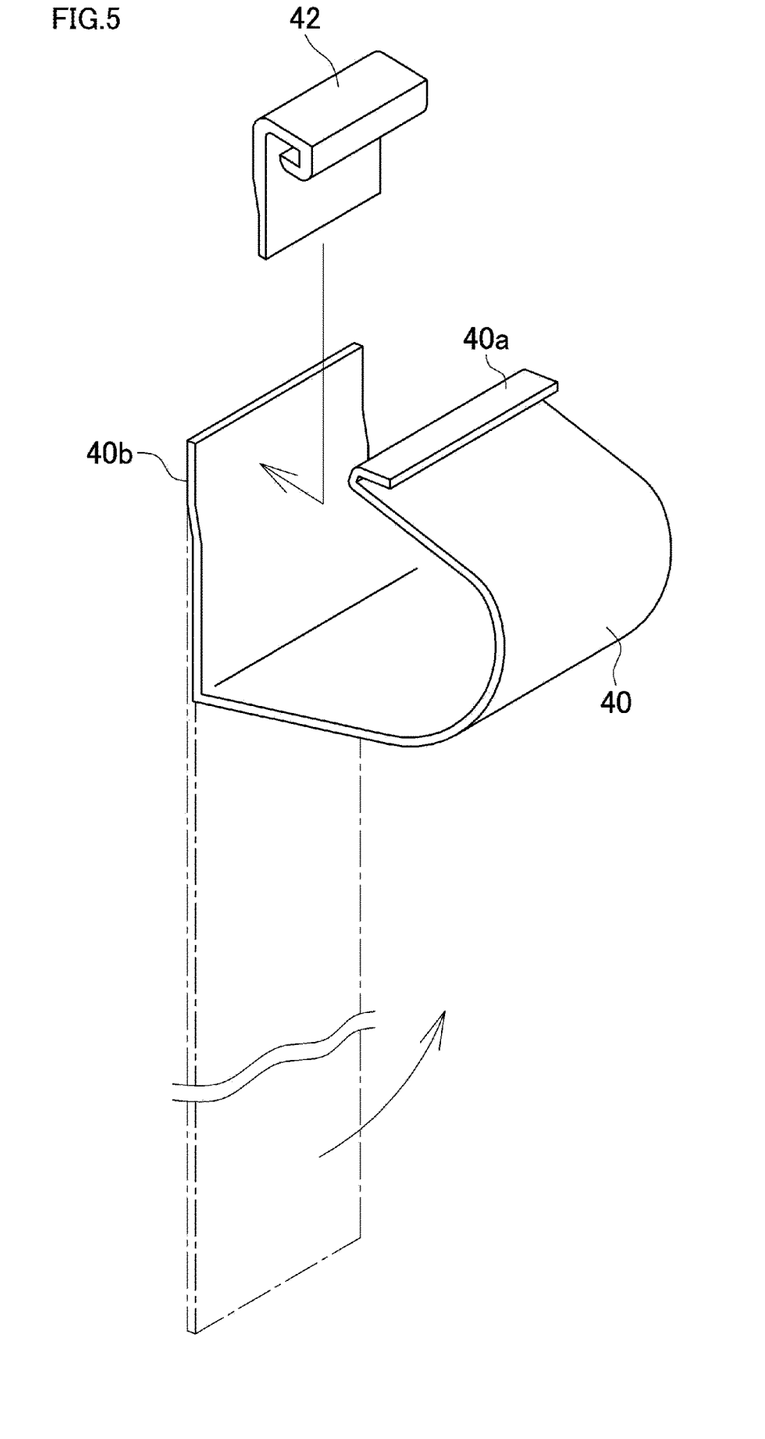
FIG. 5 is a perspective view of an embodiment of the connecting member.

FIG. 5 is a perspective view of an embodiment of the connecting member. As shown in FIG. 5, the connecting member 40 is shaped like a flat-plate as shown by a dash line, is folded, and is provided between the anchor 32 and the trim cover terminal 14-2b behind the opening 14-2'.

The band-shaped connecting member 40 is made of cloth having flexibility and tensile strength. The connecting member 40 may be made of the same cloth as the trim cover 14-2. The connecting member 40 may best be made of polyester fibers, i.e., material of the strap of the seat belt.

One end 40a of the connecting member 40 is sewn to the trim cover terminal 14-2b behind the opening 14-2'. The other end 40b of the connecting member is wound around the connecting pipe 16 and is engaged with the bracket 32, more precisely with the front wall 32b of the bracket. A hook-shaped strip 42 is secured to the other end 40b of the connecting member. Hence, the other end 40b of the connecting member can engage with the bracket 32, by a one-touch operation, if the strip 42 engages with the upper edge 32b' of the front wall of the bracket. The connecting member 40 is stretched between the bracket 32 and the trim cover terminal 14-2b behind the opening 14-2', wrapping the connecting pipe 16. The connecting member 40 can draw the trim cover terminal 14-2b into the recess 14-1', escaping the trim cover terminal downwards.

The strip 42 is made of, for example, resin. If made of resin, the strip 42 can be easily secured, by sewing, to the other end 40b of the connecting member, which is made of cloth.

In the embodiment, the strip 42 is covered with a cloth strip 14-3 and concealed, and is prevented from being exposed. For example, one end 14-3a of the cloth strip 14-3, which is made of the same cloth as the trim cover 14-2, is sewn to the trim cover terminal 14-2a before the opening 14-2', and the other end 14-3b of the cloth strip 14-3 covers the strip 42 and hangs down into the recess 14-1'. Thus, the strip 42 is concealed.

As shown in FIG. 1, the engagement member 24 provided on the back of the child seat 20 is engaged with the front bar 30b of each anchor 30 while the child seat remains inclined with its back lowered. Since the child seat 20 is inclined, the engagement member 24, which has the bifurcated shape, may bite the trim cover terminal 14-2b behind the opening 14-2'.

Nonetheless, in the embodiment, the trim cover terminal 14-2b behind the opening 14-2' is drawn into the recess 14-1' and the trim cover terminal 14-2b escapes downwards. This is because the connecting member 40 extends between the bracket 32 and the trim cover terminal 14-2b behind the opening, wrapping the connecting pipe 16. Therefore, the lower arm 24L of the engagement member 24 never bites the trim cover terminal 14-2b behind the opening 14-2' even if the engagement member is engaged with the front bar 30b of each anchor while the child seat 20 remains inclined with its back lowered. Further, the trim cover terminal 14-2b is prevented from being bitten in the groove 24a made in the rear end of the engagement member 24.

Since the trim cover terminal 14-2b behind the opening 14-2' is never bitten in the groove 24a of the engagement member, the front bar 30b of each anchor is engaged in the groove 24a and reaches to the rear end of the groove. As a result, the child seat 20 is reliably held by the anchors 30.

Since the trim cover terminal 14-2b behind the opening 14-2' is never bitten in the groove 24a of the engagement member, it is prevented from being damaged by the engagement member 24. Therefore, the outer appearance of the trim cover 14-2 is not impaired.

Since the anchors 30 are secured by the brackets 32 to the connecting pipe 16, the recesses 14-1' of the pad and the openings 14-2' of the trim cover are elongate in the front-rear direction. Nonetheless, the trim cover terminal 14-2b behind the opening 14-2' is drawn into the recess 14-1' of the pad and escapes downwards. Therefore, the engagement member 24 never bites the trim cover terminal 14-2b behind the opening even if the recesses 14-1' and the openings 14-2' are elongate in the front-rear direction. This can prevent the trim cover terminal 14-2b from being bitten.

Since the end 40b of each connecting member 40 is engaged with the associated bracket 32, the bracket 32 can be effectively utilized.

Further, since each connecting member 40 is wound around the connecting pipe 16, it can be easily stretched between the trim cover terminal 14-2b behind the opening 14-2' and the associated bracket 32. The trim cover terminal 14-2b can therefore be drawn into the recess 14-1' of the pad with an appropriate pulling force.

If the car is hit at the rear or makes an abrupt stop, a load larger than usual will act on the child seat 20. This load is transmitted via the engagement members 24 of the child seat to the front bars 30b of the anchors. The anchors 30 receive the load because of their flexural rigidity. Each anchor has its side bars 30a secured, at rear end, to the connecting pipe 16, and its front bar 30b connected to the front ends of the side bars. The anchor is therefore formed like a cantilever. Hence, if the anchor 30 receives the large load and cannot withstand the load with flexural rigidity, the anchor, more precisely its side bars 30a will be inevitably deformed.

The side bars 30a of each anchor extend forward obliquely from an upright position (see FIG. 3A). Hence, the side bars undergo buckling deformation (see FIG. 3B), and are not so much deformed as they undergo bending deformation.

Further, as the side bars 30a of the anchors are deformed, the engagement members 24 of the child seat move down. The brackets 32 are positioned below the engagement members, and may abut on the lower edges of the engagement members. Hence, if the engagement members move down, their lower surfaces 24' will abut on the upper edges 32b' of the front walls of the brackets, receiving the load and preventing the engagement members from moving further downward. That is, the brackets prevent the side bars 30a from being deformed further.

Hence, even if the car is hit at the rear or makes an abrupt stop, a large load acts on the child seat 20 and is then transmitted via the engagement members 24 to the anchors 30, the anchors are reliably prevented from being excessively deformed, without increasing their diameter.

Since the notches 32c holding the front circumferential surface of the connecting pipe 16 are made in the rear edges of the side walls 32a of the brackets 32, the brackets are secured (welded) to the connecting pipe 16 over a sufficiently long distance. Thus, the brackets 32 are so firmly fastened to the connecting pipe 16 and they can withstand the load transmitted from the child seat 20 to the anchors 30.

Moreover, the front wall 32b of each bracket extends at right angles to the left-right direction in which the associated engagement member 24 extends. Hence, the lower surface 24' of the engagement member reliably abuts on the upper edge 32b' of the front wall even if the child seat 20 shifts in the left-right direction and then is mounted on the seat 10.

As described above, each connecting member is stretched, drawing the trim cover terminal behind the opening into the recess of the pad and escaping the same downwards. This prevents each engagement member provided on the back of the child seat from biting the trim cover terminal behind the opening. Ultimately, the trim cover terminal is prevented from being bitten in the groove made in the engagement member. Therefore, the front bar of each anchor moves to the rear end of the groove of the engagement member, and the child seat is therefore reliably held by the anchors.

The embodiments have been described to explain this invention, and are not intended to limit the scope of the invention. Accordingly, various changes and modifications may be made within the spirit or scope of this invention, and are of course included in this invention.

In the embodiment (Embodiment 1), the anchors are provided at the seat cushion. That is, the anchors are secured by brackets to the connecting pipe extending between the rear ends of the left and right side frames 14f of the seat cushion frame. Instead, the anchors may be provided at the seatback.

Child seats of the ISO-FIX type are commonly used. Nonetheless, this invention can be applied to child seats of any other type, as well.

In the embodiment (Embodiment 1), the anchors 30 are provided at the seat cushion 14. That is, the anchors are secured by the brackets to the connecting pipe (the rear connecting pipe) 16 extending between the rear ends of the left and right side frames 14f of the seat cushion frame. Instead, the anchors may be provided at the seatback 12.

Embodiment 2

A vehicle seat according to another embodiment (Embodiment 2) of this invention will be described with reference to FIGS. 6 and 7.

The components identical to those of the embodiment (Embodiment 1) described above are designated by the same reference numbers, and will not be described. The components different from those of the above-described embodiment (Embodiment 1) will be described in the main.

Figure 6:
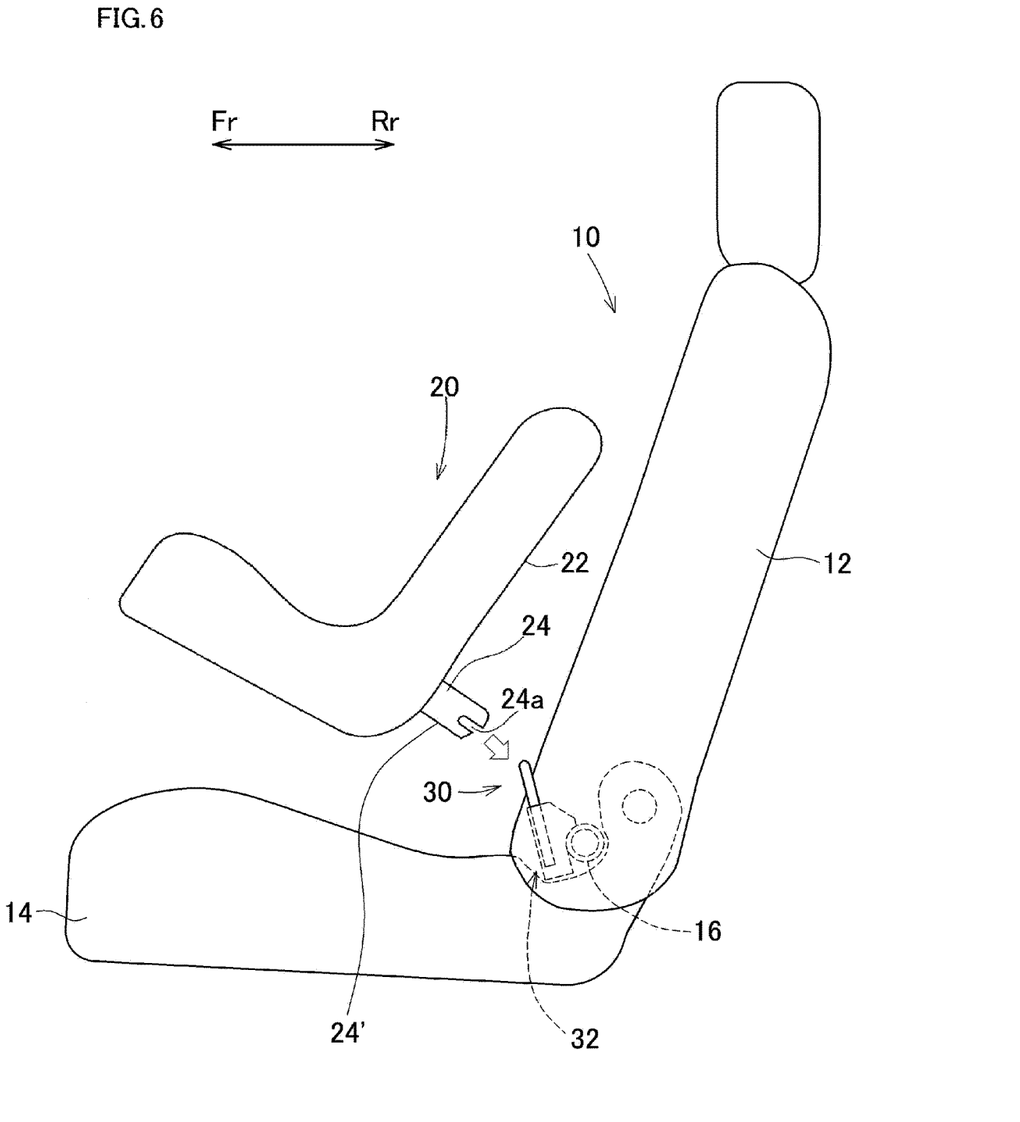
FIG. 6 is a schematic side view of a vehicle seat according to another embodiment (Embodiment 2) of this invention.
Figure 7:
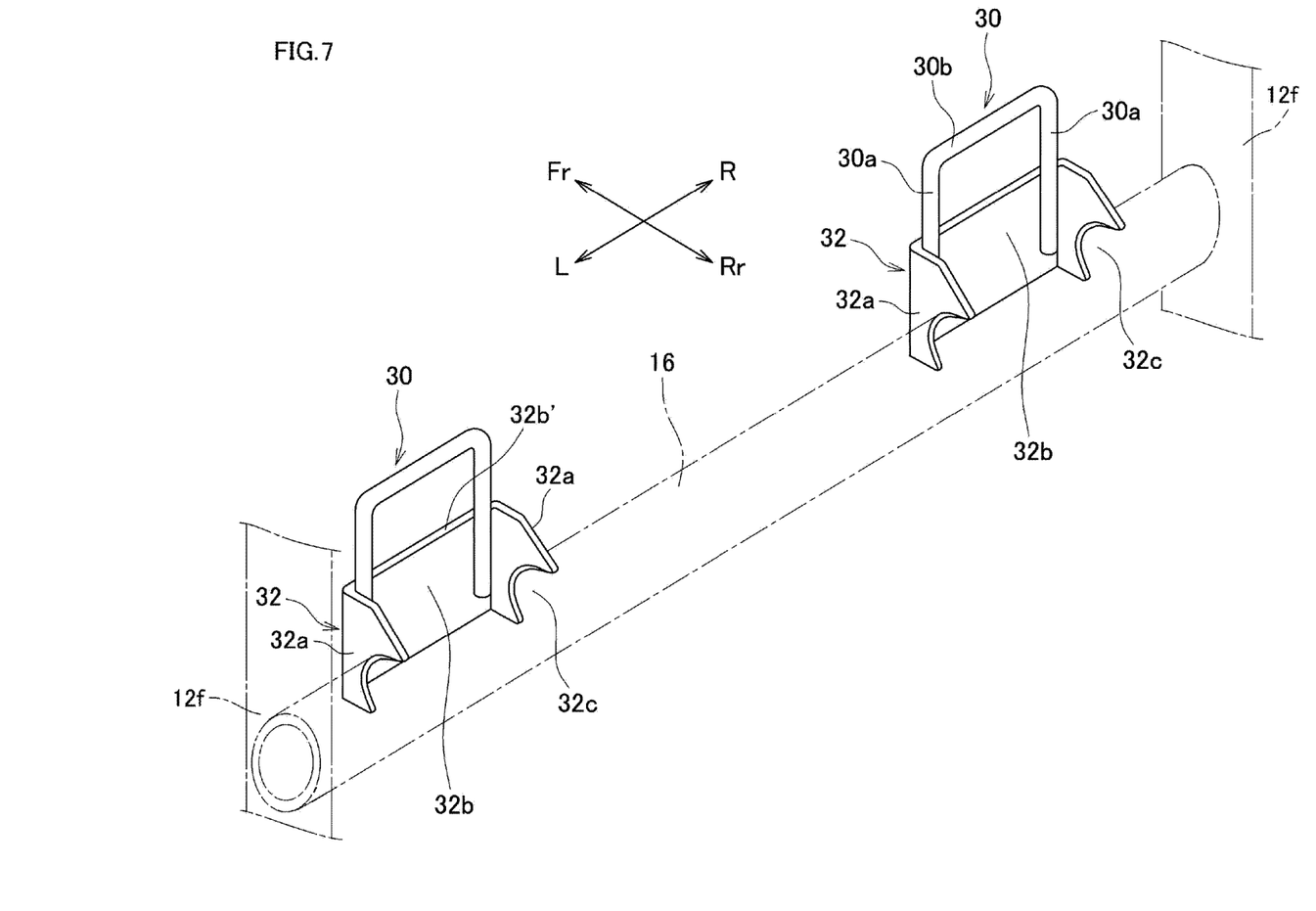
FIG. 7 is a perspective view of an embodiment of the anchors and brackets used in the vehicle seat according to another embodiment.
Figure 7A:
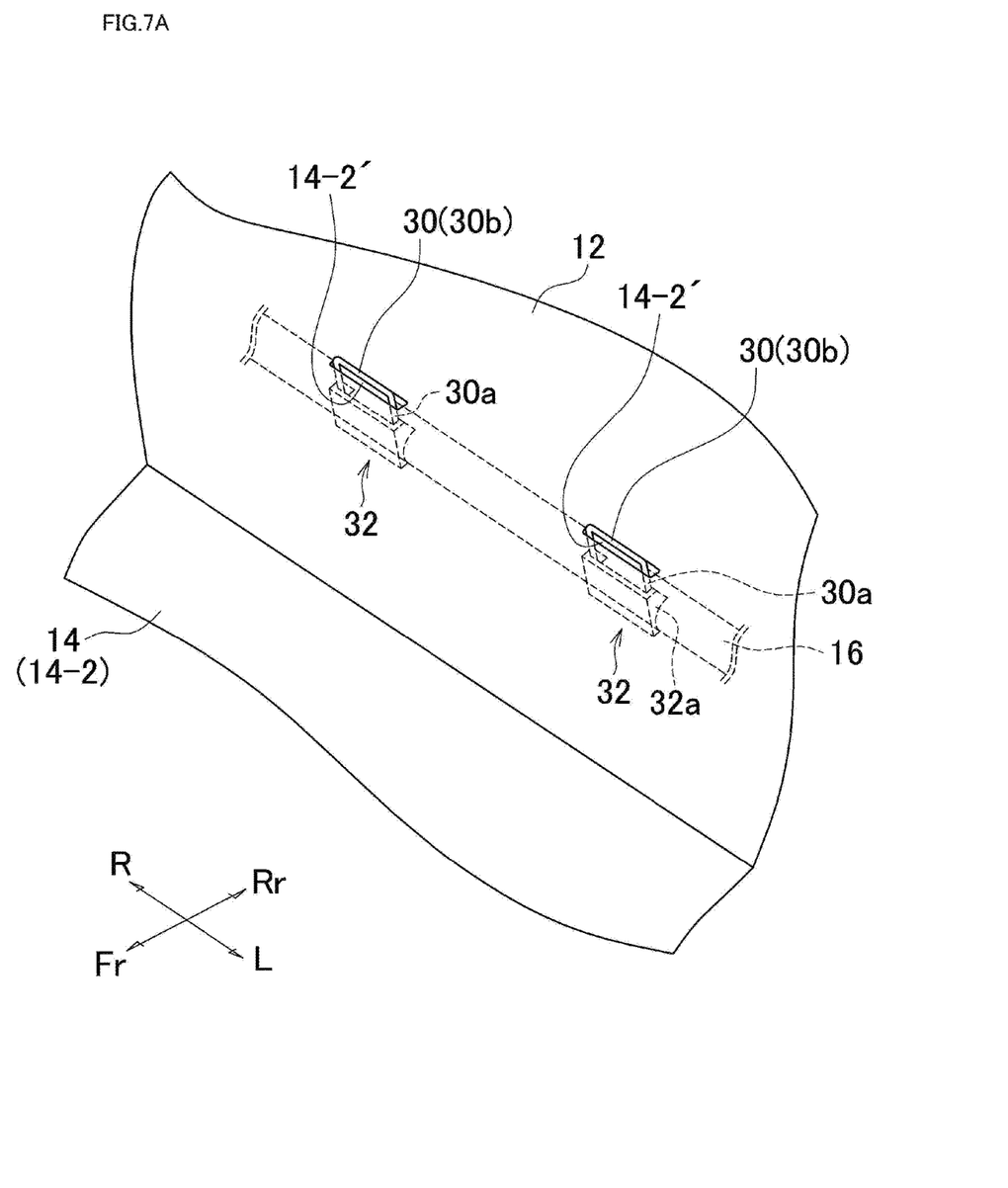
FIG. 7A is a perspective view of an embodiment of the anchors and brackets showing the openings in the trim cover.

Embodiment 2 shown in FIGS. 6 and 7 differs from Embodiment 1 in that the anchors 30 are provided at the seatback 12. The anchors 30 are secured by the brackets 32 to the connecting pipe 16 extending, in the left-right direction, namely extending in a direction parallel to the front bars of the anchors, between the lower ends of the left and right side frames 12f of the seatback frame.

In the embodiment 2, the side bars 30a of each anchor 30 are supported by the bracket 32, and extend forward obliquely from an upright position. The bracket 32 is positioned to abut on the associated engagement member 24 of the child seat 20 as shown in FIG. 3A when the side bars 30a are deformed. Hence, the side bars 30a undergo buckling deformation and are not so much deformed as they undergo bending deformation. Further, as the side bars 30a of the anchors 30 are deformed, the engagement members 24 move down and abut on the brackets 32 as shown in FIG. 3B. Receiving a load, the brackets 32 prevent the engagement members 24 from moving down further, preventing the deformation of the side bars 30a. Thus, even if a large load acts on the anchors 30, the anchors are reliably prevented from being excessively deformed, without increasing their diameter.

INDUSTRIAL APPLICABILITY

This invention can be used in various types of vehicle seats having anchors for holding child seats.

What is claimed is:

1. A vehicle seat in combination with a child seat, said child seat having an engagement member provided on a back; the vehicle seat comprising:
   a seatback;
   a seat cushion; and
   a pair of anchors structured to hold the child seat of an ISO-FIX type, wherein
   each anchor has a pair of left and right side bars and a front bar coupled to upper ends of the left and right side bars, and is a U-shaped form as seen in a plan view, the front bars of the anchors are structured to engage with the engagement member provided on the back of the child seat,
   the left and right side bars of said each anchor are secured by brackets to a connecting pipe provided in the seat cushion or the seatback and extending in a direction parallel to the front bars of the anchors, a pair of recesses each for holding an anchor is made in a pad,
   a trim cover for covering the pad has openings each above a recess of the pad,
   the engagement member has a bifurcated shape as seen in a side view and has at a distal end a groove for engaging with the front bar of the anchor, and
   a pair of connecting members, which have one end connected to a terminal of the trim cover behind the openings of the trim cover and the other end engaged with the bracket, are wound around the connecting pipe and are stretched each between the bracket and the trim cover terminal behind the openings, each drawing the trim cover terminal behind the openings into the recess of the pad.

2. The vehicle seat according to claim 1, wherein the connecting member has a strip at the other end, and is connected to the bracket by the strip.

3. The vehicle seat according to claim 2, wherein the connecting member is made of cloth, the strip is made of resin, and the connecting member is sewn, at one end, to the trim cover terminal behind the openings, and at the other end, to the strip.

4. The vehicle seat according to claim 3, wherein each anchor is supported by the bracket and extends forward obliquely from an upright position, and the bracket is so positioned that the engagement member abuts on the bracket when the side bars of the anchor are deformed by a load transmitted to the front bar via the engagement member of the child seat and acting downwards.

5. The vehicle seat according to claim 4, wherein the connecting pipe is stretched in a direction parallel to the front bars of the anchors, between the rear ends of the left and right side frames of the seat cushion frame or the lower ends of the left and right side frames of the seatback frame.

6. The vehicle seat according to claim 2, wherein each anchor is supported by the bracket and extends forward obliquely from an upright position, and the bracket is so positioned that the engagement member abuts on the bracket when the side bars of the anchor are deformed by a load transmitted to the front bar via the engagement member of the child seat and acting downwards.

7. The vehicle seat according to claim 2, wherein the connecting pipe is stretched in a direction parallel to the front bars of the anchors, between the rear ends of the left and right side frames of the seat cushion frame or the lower ends of the left and right side frames of the seatback frame.

8. The vehicle seat according to claim 3, wherein the connecting pipe is stretched in a direction parallel to the front bars of the anchors, between the rear ends of the left and right side frames of the seat cushion frame or the lower ends of the left and right side frames of the seatback frame.

9. The vehicle seat according to claim 1, wherein each anchor is supported by the bracket and extends forward obliquely from an upright position, and the bracket is so positioned that the engagement member abuts on the bracket when the side bars of the anchor are deformed by a load transmitted to the front bar via the engagement member of the child seat and acting downwards.

10. The vehicle seat according to claim 1, wherein the connecting pipe is stretched in a direction parallel to the front bars of the anchors, between the rear ends of the left and right side frames of the seat cushion frame or the lower ends of the left and right side frames of the seatback frame.

* * * * *